United States Patent
Buzzi

(10) Patent No.: US 8,690,620 B2
(45) Date of Patent: Apr. 8, 2014

(54) THROUGH-HULL SUPPORT FOR STEERING AND PROPELLING A BOAT AND BOAT EQUIPPED WITH SUCH A SUPPORT

(75) Inventor: Fabio Buzzi, Oggiono LC (IT)

(73) Assignee: FB Design S.r.l., Annone Brianza LC (IT)

( * ) Notice: Subject to any disclaimer, the term of this patent is extended or adjusted under 35 U.S.C. 154(b) by 0 days.

(21) Appl. No.: 13/496,843

(22) PCT Filed: Aug. 5, 2010

(86) PCT No.: PCT/IB2010/001982
§ 371 (c)(1),
(2), (4) Date: Apr. 25, 2012

(87) PCT Pub. No.: WO2011/036522
PCT Pub. Date: Mar. 31, 2011

(65) Prior Publication Data
US 2012/0214368 A1    Aug. 23, 2012

(30) Foreign Application Priority Data
Sep. 22, 2009   (IT) .......................... MI2009A001612

(51) Int. Cl.
*B63H 5/07* (2006.01)
(52) U.S. Cl.
USPC .................... 440/79; 440/80; 440/81; 440/53
(58) Field of Classification Search
USPC ................ 440/80, 76, 79, 75, 55, 53, 51
See application file for complete search history.

(56) References Cited

U.S. PATENT DOCUMENTS

| | | | |
|---|---|---|---|
| 2,096,223 A | 10/1937 | Chandler | |
| 2,167,552 A | 7/1939 | Paine | |
| 3,003,458 A | 10/1961 | Starns, Jr | |
| 4,295,834 A | 10/1981 | Buzzi | |
| 4,443,202 A * | 4/1984 | Arena | 440/51 |
| 4,544,362 A * | 10/1985 | Arneson | 440/61 R |
| 4,887,982 A * | 12/1989 | Newman et al. | 440/81 |
| 4,919,630 A * | 4/1990 | Erdberg | 440/79 |
| 5,074,814 A * | 12/1991 | Hogg | 440/79 |
| 5,183,423 A * | 2/1993 | Alinari | 440/53 |
| 5,326,294 A * | 7/1994 | Schoell | 440/79 |
| 5,352,141 A * | 10/1994 | Shields et al. | 440/80 |

(Continued)

*Primary Examiner* — Lars A Olson
*Assistant Examiner* — Jovon Hayes
(74) *Attorney, Agent, or Firm* — Hedman & Costigan, P.C.; James V. Costigan; Kathleen A. Costigan

(57) ABSTRACT

Boat (10) comprising a steering and propelling unit comprising at least one driving shaft (11, 11') passing in an opening of the transom (12) for transmitting the motion from a motor to at least one propeller (21, 21'), at least one steering (14) provided at the top with at least one rotation pin (13), and a through-hull support (100) able to be associated with the opening and equipped with a plate portion (101) able to be fixed on the outside to the hull (12) of the boat (10) and with a through-hull tubular portion (102) for support of the at least one driving shaft (11, 11'), in which the through-hull support (100) also comprises at least one bush (103) passing through the plate portion (101) to support, in a rotary manner, the pin (13) bearing the steering (14) and in which the wall (12) of the hull where the passage opening of the at least one driving shaft (11, 11') is formed is inclined from the top to the bottom in the direction of the stem of the boat (10).

6 Claims, 5 Drawing Sheets

(56) References Cited

U.S. PATENT DOCUMENTS

| | | | | |
|---|---|---|---|---|
| 5,366,398 | A | * | 11/1994 | Meisenburg et al. ............ 440/81 |
| 5,405,278 | A | | 4/1995 | Garland |
| 5,439,403 | A | * | 8/1995 | Rolla ............................... 440/51 |
| 5,505,642 | A | * | 4/1996 | Theophanides ................. 440/66 |
| 5,697,821 | A | * | 12/1997 | Ogino ............................. 440/80 |
| 5,921,828 | A | * | 7/1999 | Ogino ............................. 440/86 |
| 5,931,710 | A | * | 8/1999 | Johnson, Sr. .................... 440/55 |
| 5,993,274 | A | * | 11/1999 | Rising et al. .................... 440/53 |
| 6,186,845 | B1 | * | 2/2001 | Head ............................... 440/57 |
| 6,193,573 | B1 | | 2/2001 | Small |
| 6,431,927 | B1 | * | 8/2002 | Sage ............................... 440/53 |
| 7,070,469 | B2 | * | 7/2006 | Stallings ......................... 440/79 |
| 7,297,035 | B2 | * | 11/2007 | Broussard ....................... 440/75 |
| 7,431,621 | B2 | * | 10/2008 | Fuse et al. ....................... 440/82 |
| 7,517,264 | B2 | * | 4/2009 | Carr ................................. 440/75 |
| 2004/0092177 | A1 | | 5/2004 | Creighton |
| 2012/0214368 | A1 | * | 8/2012 | Buzzi ............................. 440/79 |

\* cited by examiner

PRIOR ART

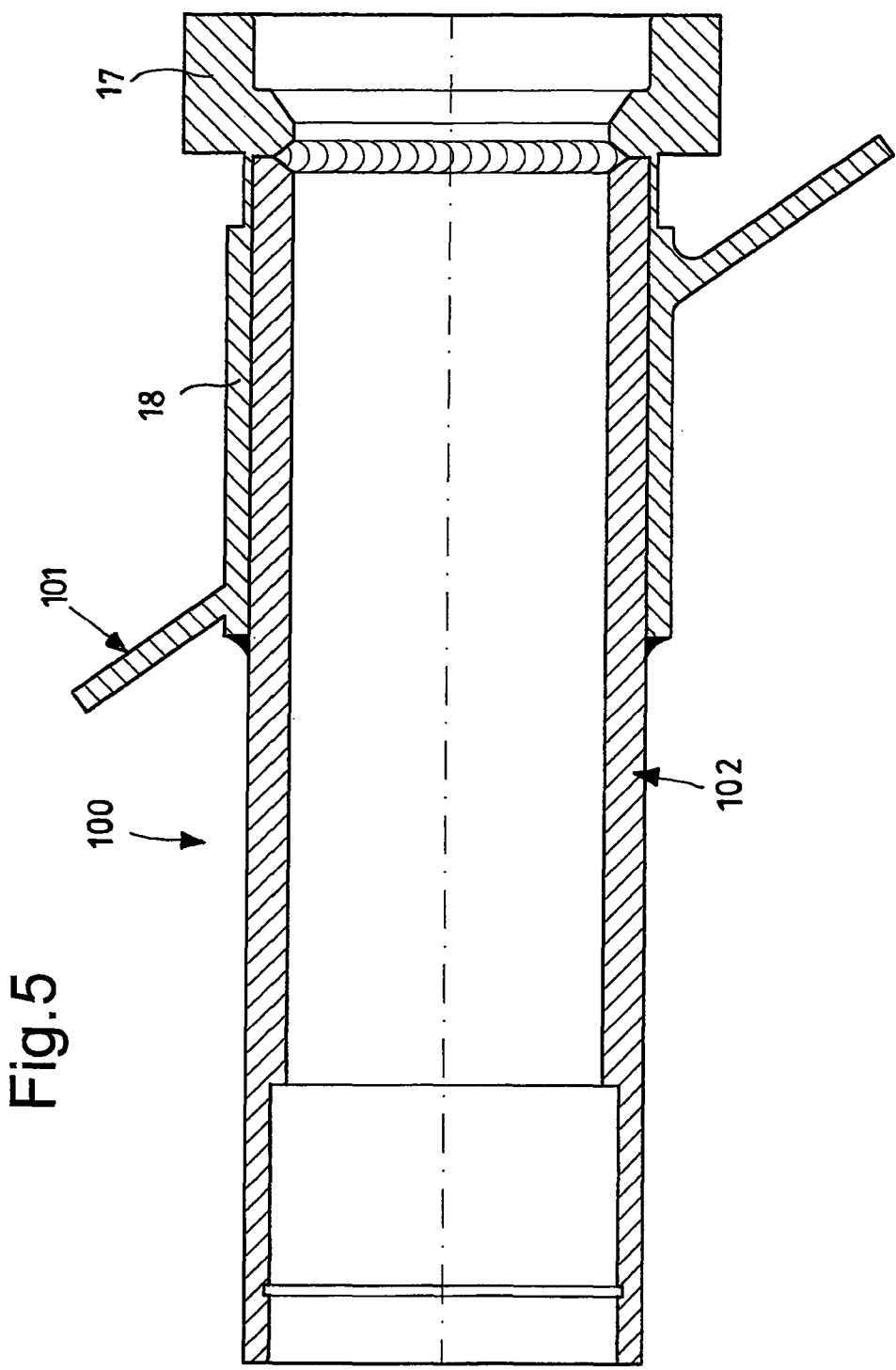

THROUGH-HULL SUPPORT FOR STEERING AND PROPELLING A BOAT AND BOAT EQUIPPED WITH SUCH A SUPPORT

The present invention refers to a through-hull support for steering and propelling a boat and to a boat equipped with such a support.

Currently there are numerous types of boats that differ from one another in the mutual arrangement of the propulsion and of the steering, usually positioned in the rear part of the boat known as transom.

In FIGS. 1A-1D four types of boats currently existing are schematically shown in which the vertical lines identify the station of the transom where the propulsion axle passes from inside to outside the hull.

The propulsions shown in such figures are examples.

The first example of the prior art shown in FIG. 1A comprises a conventional propulsion with immersed propeller and a steering arranged astern of the propeller.

In such an embodiment the components that control the motion of the steering are inside the hull and therefore protected from accidental collisions during reversing by the hull itself.

FIG. 1B shows an analogous embodiment to the previous one of FIG. 1A in which, however, the propeller and the steering are only partially immersed.

Such two first described embodiments have a steering system separate from the propulsion arranged astern of the propeller and in view of such a separation they have the drawback of requiring long hulls able to supports the steerings downstream of the propellers.

In order to avoid such a drawback and to reduce the bulk of the transom area, there are currently steering propulsions on the market in which the steering means of the boat are integrated with the propulsion. The most common example of this kind of steering propulsions is the so-called "outdrive", an example of which is shown in FIG. 1D.

In the case of the "outdrive" the transmission is made up of a box fixed to the transom, so as to ensure the water-tight seal, in which the motion is transmitted to a propeller or to a pair of coaxial and counter-rotating propellers. Electric, hydraulic or electro-hydraulic pistons give the boat the possibility of steering thanks to the presence of a spherical body, or else of a Cardan joint.

Another example of steering propulsions is that of articulated transmissions an example of which is shown in FIG. 1C.

Such articulated propulsions are generally made up of a body shaped like a cylinder or a frustum of cone, extending around the transmission axle, which extends from the transom, and with respect to which it can take up different angles thanks to the presence of a spherical joint or a Cardan joint. This movement is controlled by a plurality of pistons, generally hydraulic, fixedly connected on one side to the hull and on the other side to the body of the transmission. The installation of propulsions of the type able to steer undoubtedly has the advantage of saving a separate steering system by making a single integrated propulsion-steering system that takes up less space in the transom area with respect to the embodiments of FIGS. 1A and 1B in which the propulsion and the steering are separate.

However, such steering propulsions also have some drawbacks. As can be worked out, the combination of many functions, with the integration of many systems in a single component, although it reduces the space taken up, requires a more complex design and higher manufacturing costs.

In addition to this set of drawbacks, there can be safety and reliability problems of a steering propulsion in which, indeed, the actuators that allow the steering are mounted outside of the boat, thus more subject to corrosion.

This aspect forces these boats to be subjected to frequent maintenance consequently with less operating availability of the boat, an important parameter for commercial applications.

The position of the actuators also makes them more easily subject to accidental collisions with foreign objects during navigations or during mooring maneuvers, in the port. Moreover, the actuators can be hit by loads that are not always predictable and that can be taken into consideration during sizing.

A typical example is that due to the impact with water, when the boat accidentally, due to adverse weather-marine conditions, bounces on the waves, i.e. completely coming out from the water and quickly going back in again.

It is totally clear that the breaking of a hydraulic piston for adjusting an articulated propulsion during navigation can have lethal effects not only upon the hull but also and particularly upon its occupants.

As well as the possibility of open leaks in the hull at the attachment points, in the case of breaking, it is absolutely clear that the boat thus damaged would simultaneously be without propulsion and without the possibility of being directed.

The purpose of the present invention is to make a device capable of solving the aforementioned drawbacks of the prior art in an extremely simple, cost-effective and particularly functional manner.

Another purpose is to make a through-hull support for steering and propelling a boat that makes it possible to make a compact boat with hulls in the transom area of smaller size and in which the steering is arranged between the hull and the propellers.

Another purpose is to make a through-hull support for steering and propelling a boat that makes it possible to make a boat in which the means for controlling the rotation of the steering are arranged protected inside the boat. Another purpose is to make a transmission with a greater propulsive efficiency in reverse to that of conventional transmissions.

These purposes according to the present invention are accomplished by making a through-hull support for steering and propelling a boat and a boat equipped with such a support as outlined, in claim 1.

Further characteristics of the invention are outlined by the dependent claims.

The characteristics and advantages of a through-hull support for steering and propelling a boat and of a boat equipped with such a support according to the present invention will become clearer from the following description, given as an example and not for limiting purposes, referring to the attached schematic drawings in which:

FIG. 5 shows a section view of a through-hull support for steering and propelling a boat according to the present invention;

With reference to the figures, a through-hull support for steering and propelling a boat according to the present invention is shown with 100 and the aft part of a boat equipped with such a support is shown with 10.

Figure 1A:
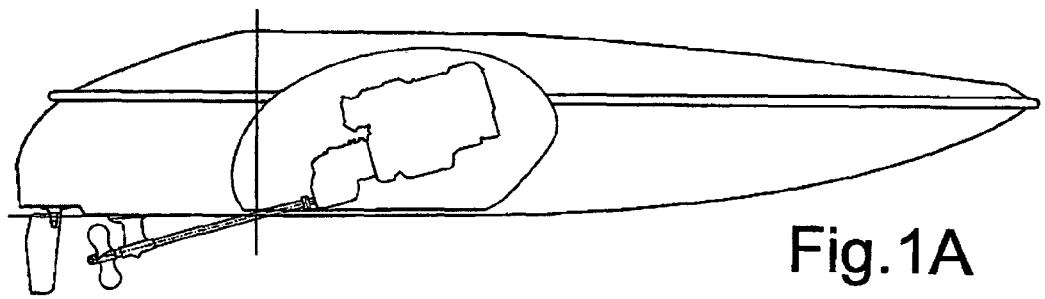
FIGS. 1A-1D show schematic views of boats made according to the prior art.
Figure 1B:
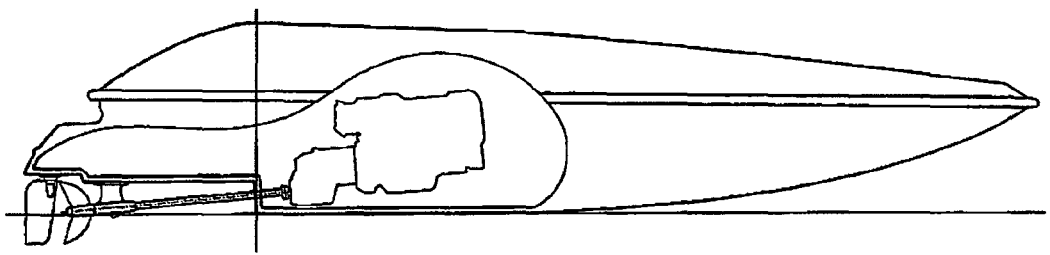
Figure 1C:
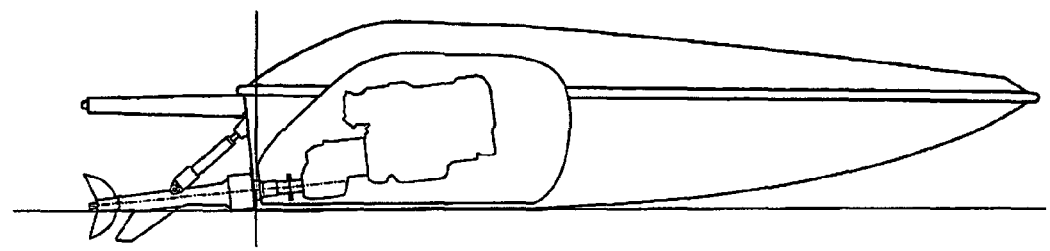
Figure 1D:
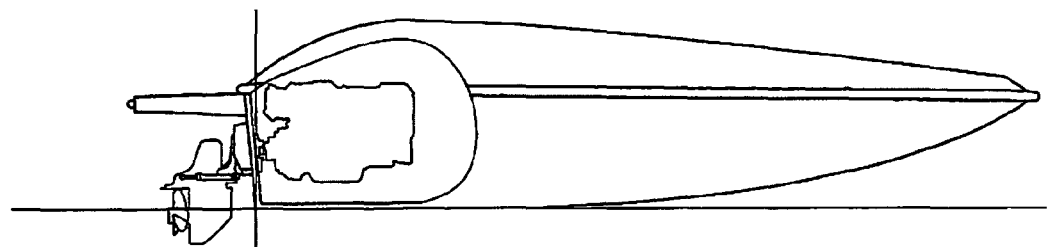
Figure 3:
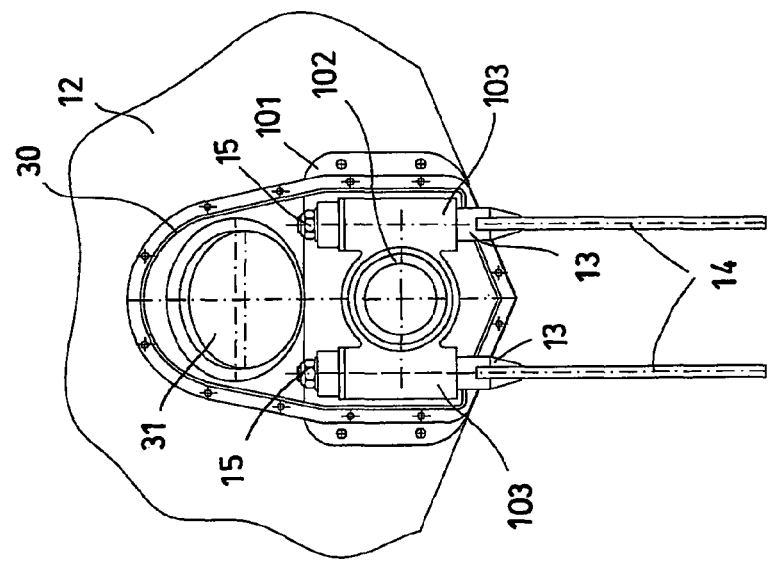
FIG. 3 shows a schematic rear elevational view of the detail of FIG. 2.
Figure 2:
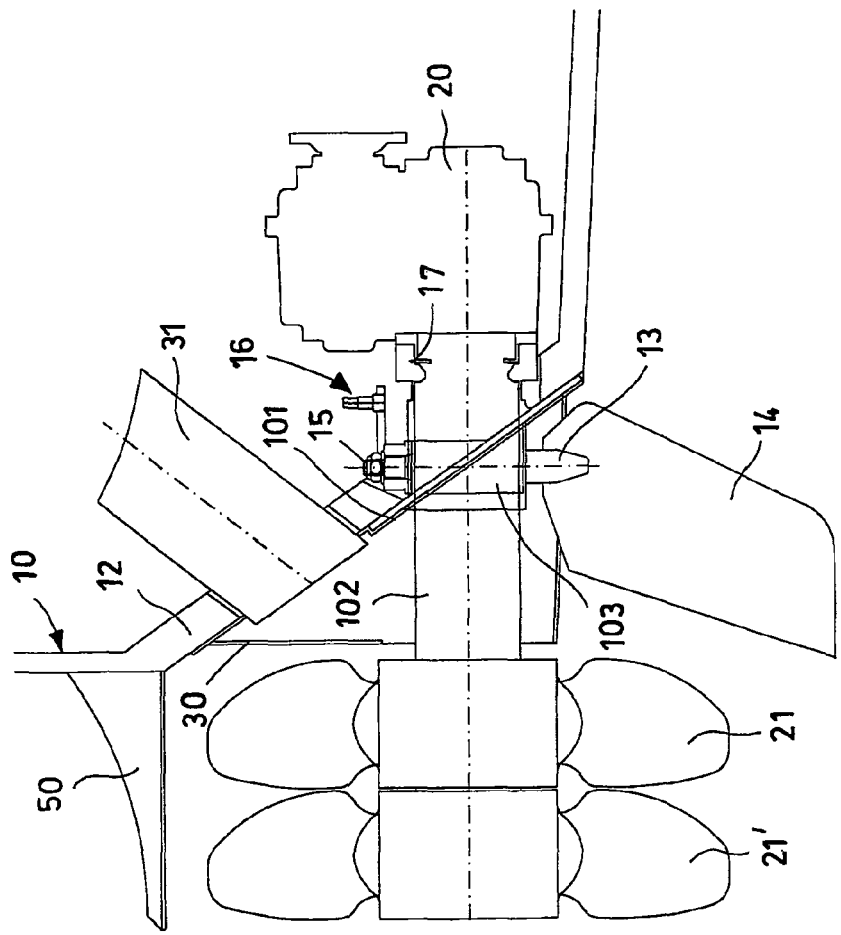
FIG. 2 shows a schematic side view partially in section of a detail of a boat provided with the through-hull support according to the present invention.
Figure 4:
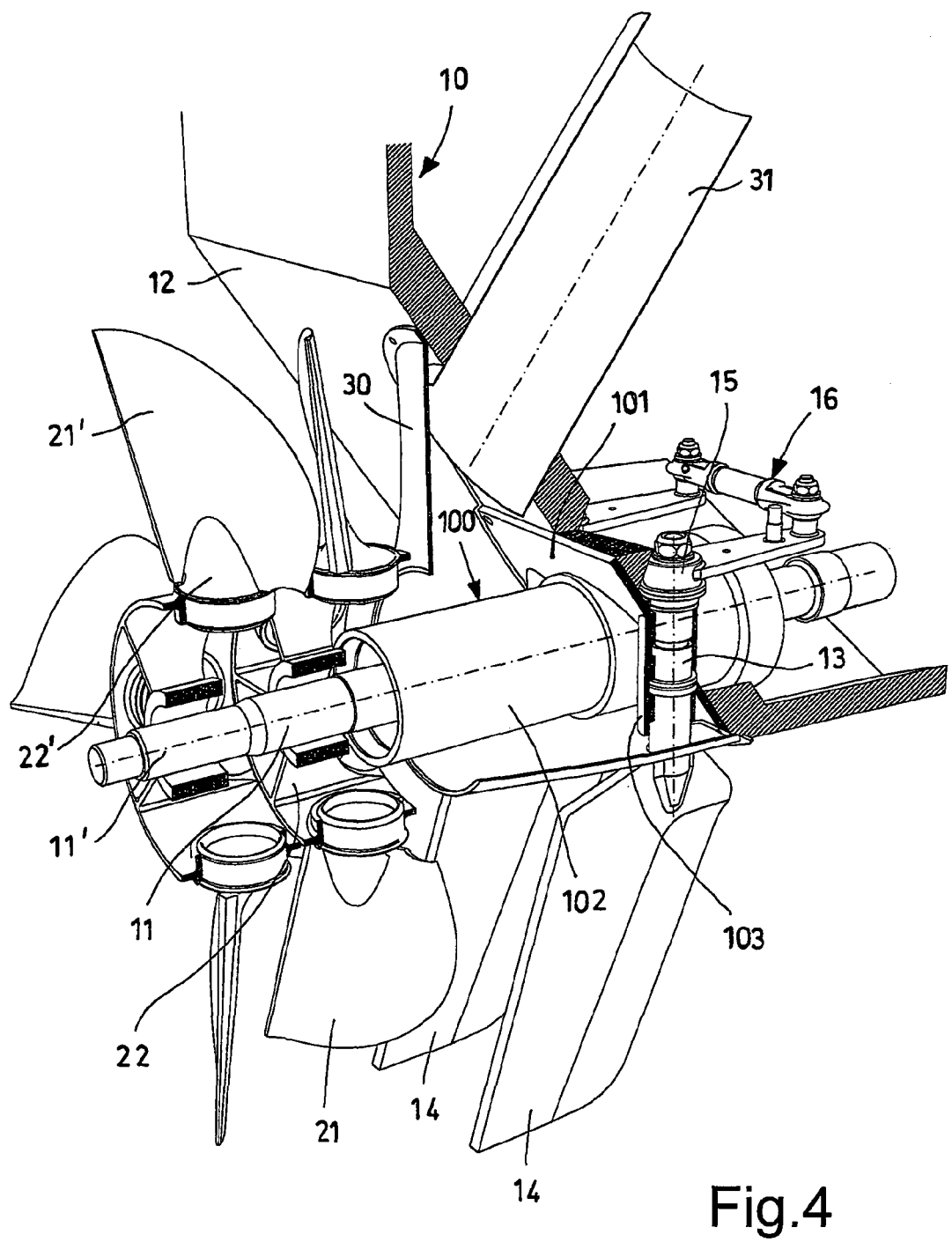
FIG. 4 shows a schematic perspective view partially in section of the detail of FIG. 2.

As can be seen in FIG. 4 or in FIG. 2 the propulsion unit of the boat 10 comprises a gearbox 20, known as reversing gear, arranged inside the boat and capable of actuating at least one, preferably two as shown in the figures, coaxial and counter-rotating driving shafts 11, 11' bearing propellers 21, 21'.

Alternatively, the motion inverter unit can also be separate from the gearbox that transmits the motion to the counter-rotating coaxial shafts.

Such shafts 11, 11' transit from inside the boat 10 towards the outside through an opening formed on a wall, preferably inclined, known as chute, in the transom 12.

Preferably, the propellers 21, 21' are supported on the relative shafts through spoked hubs 22, 22'.

The steering system comprises at least one steering 14 provided at the top with a rotation pin 13 connected at the top to the relative means 16 for controlling the rotation, per sé known, and misaligned with respect to the middle. The through-hull support 100 according to the present invention, visible in section in FIG. 5 and partially sectioned in FIG. 4, supports both the driving shafts 11, 11' and the rotation pins 13 of the steerings 14 allowing the steerings 14 to be positioned in a position extremely close both to the hull and to the propellers 21, 21'. In particular, the support of the steerings 14 is such that they will be positioned at the front with respect to the propellers 21, 21'.

Such an arrangement makes it possible to make an extremely compact transom where it is no longer necessary for there to be long support tails of the steerings otherwise positioned at the aft.

Such a through-hull support 100 of the present invention can be applied at the passage opening of the driving shafts 11, 11' and comprises a plate portion 101, able to be fixed outside of the hull of the boat, and a through-hull tubular portion 102 for support of driving shafts 11, 11'.

The sealing and the guiding of the driving shafts 11, 11' inside the tubular portion 102 take place through the use of known tools such as gaskets and bearings found on the market.

According to the invention the steering 14 is supported by the through-hull support 100 thanks to at least one bush 103 passing through the plate portion 101, and thus penetrating inside the hull, suitable for supporting the pins 13 bearing the steerings 14 in a rotary manner.

According to what has been described above, since the bushes 103 cross the plate portion 101 and the same is arranged on the hull, the upper end 15 of the pin 13 opposite the steering 14 and connected to the means 16 for controlling the rotation of the steering itself, is arranged inside the boat.

Advantageously, the means 16 acting in rotation on the steerings 14, being arranged inside the hull, are thus not subject to corrosion, but protected from possible collisions with foreign objects during navigations or during mooring maneuvers.

In the embodiment shown the through-hull support 100 comprises two bushes 103 arranged symmetrically on opposite sides with respect to the tubular portion 102.

In the embodiment shown in FIG. 5, the plate portion 101 at the rear comprises a sleeve 18 passing into the opening of the hull coupled with the tubular portion 102 and is provided with a rear flange 17 for attachment to the gearbox 20.

The plate portion 101 and tubular portion 102 can be elements made separately and subsequently welded together, as shown in FIG. 5, or else they can be made directly in one piece.

As quoted earlier, the wall 12 of the hull where the transit opening of the at least one driving shaft 11, 11' is formed is preferably inclined with respect to the driving shaft 11, 11' itself, substantially horizontal, directed from the top to the bottom in the direction of the stem of the boat. The state of the art, shown in FIGS. 7A and 7B, on the contrary foresees that the wall of the hull where the passage opening for the driving shaft is formed is substantially vertical and perpendicular to the driving shaft. According to the invention, also the plate portion 102, as shown in FIG. 5, will be suitably inclined to adhere to the inclined wall 12.

Figure 6:
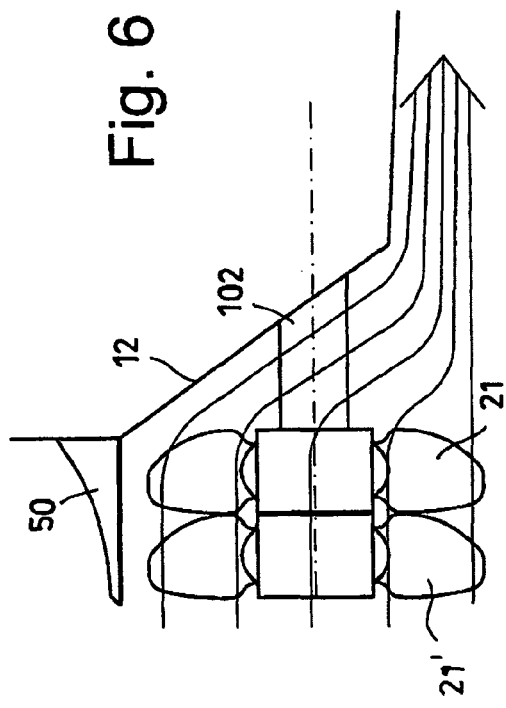
FIG. 6 shows a schematic side view of a detail of a boat according to the present invention upon reversing movement.

Such an inclination of the wall 12 of the transom, by about 40°-45° as shown in FIG. 6, makes it possible to substantially increase the propulsive efficiency in reversing conditions as well as allowing the length of the rear portion of the boat to be reduced.

Indeed, thanks to such an inclined surface 12, known as "chute", during reversing all of the flow that crosses the propellers 21, 21', instead of being directed in part against the vertical wall of the transom, can flow towards the stem, increasing the efficiency of propulsion.

Figure 7B:
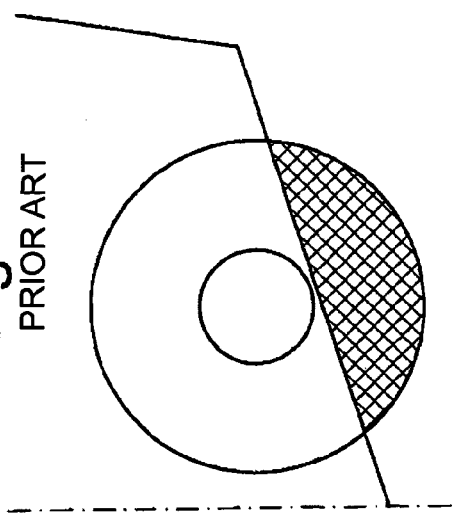
FIGS. 7A and 7B show details of boats according to the prior art.
Figure 7A:
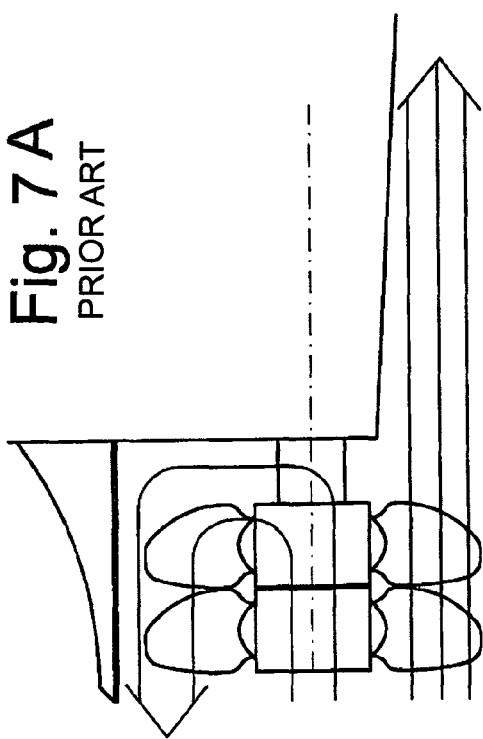

Contrarily, in the state of the art, shown in FIG. 7A, the water flow that strikes the practically vertical transom is reflected and is once again directed aftwards.

In such known embodiments therefore just the part of flow that remains undisturbed by the hull, shown schematically in FIG. 7B through the background portion on the propeller, provides a thrust useful for reversing.

Contrarily, the inclined wall 12 according to the invention deviates the part of flow that strikes the transom 12 making it slide down and towards the stem as shown in FIG. 6. The efficiency of the transmission in reverse is thus substantially increased.

If necessary it is possible to foresee an aft plank 50, of small size, to protect the propellers 21, 21' from accidental collisions with quays or other boats, during reversing. Finally, it is preferably foreseen for there to be a shell conveyor element 30, shown in FIG. 4, fixed at the back to the hull and shaped to enclose the plate portion 101 and to converge towards the propellers 21, 21' where such a shell 30 is open.

At the bottom the shell 30 comprises passage holes for the pins 13 of the steerings 14.

As can be seen in FIGS. 2 and 4, the boat 10 also comprises a discharge pipe 31 for the gases mixed with the water of the cooling system that leads inside the shell 30 that, as described above, conveys the mixture of combusted gases of the motors and seawater of the cooling system towards the spokes of the hubs 22, 22' that bear the propellers 21, 21'.

It has thus been seen that a through-hull support for steering and propelling a boat and a boat equipped with such a support achieve the purposes outlined previously. Indeed, the through-hull support for steering and propelling a boat of the present invention makes it possible to make a compact boat with hulls of small size in which the steering in arranged between the hull and the propellers and in which the means for controlling the rotation of the steerings are arranged protected inside the boat.

The through-hull support for steering and propelling a boat and the boat equipped with such a support of the present invention thus conceived can undergo numerous modifications and variants, all of which are covered by the same inventive concept; moreover, all of the details can be replaced by technically equivalent elements. In practice, the materials used, as well as the sizes, can be whatever according to the technical requirements.

The invention claimed is:

1. A boat (10) comprising a steering unit and a propulsion unit:

said propulsion unit comprising at least one driving shaft (11, 11') passing in an opening of a transom of the hull (12) to transmit motion from an engine to at least one propeller (21, 21'), and one through-hull support (100) positioned in said opening of the transom of the hull (12) and provided with a plate portion (101) fixed to said hull (12) at the outside of said hull (12) of the boat (10) and a through hull tubular portion (102) passing said plate portion (101) through said opening of the transom of said hull (12) for supporting two driving shafts (11, 11'),said steering unit comprising at least one steering (14) provided with at least one rotation pin (13), said through-hull support (100) further comprising at least one bush (103) passing through said plate portion (101) to rotationally support said pin (13) bearing said steering (14) said pin (13) having an end (15) opposite to said steering (14) that is connected to means (16) for controlling the rotation of said steering (14) where said means (16) are arranged inside said boat (10), wherein and in that said wall (12) of the hull where said passage opening of said transom of the hull (12) where said passage opening of said at least one driving shafts (11, 11') is positioned, is inclined from the top to the bottom in the direction of the stem of said boat (10), said at least one steering (14) being arranged between said hull (12) and said at least one propeller (21, 21').

2. The boat (10) according to claim 1 characterized in that said wall (12) is inclined by about 45°, said plate portion (101) of said through-hull support (100) being equally inclined.

3. The boat (10) according to claim 1 characterized in that it comprises a shell element (30) fixed—at the rear—to said hull (12), said shell element (30) being configured for covering in such a way towards said propellers (21, 21'), that exhaust gases discharged from the motor can be guided toward the propellers, said shell (30) comprising holes for the passage of said pins (13) of said steerings (14).

4. The boat (10) according to claim 3 characterized in that it comprises a pipe (31) for discharging gases mixed with the water of the cooling system that leads into said shell (30).

5. The boat (10) according to claim 1 characterized in that said two driving shafts (11, 11') are coaxial and counter-rotating driving shafts bearing propellers (21,21').

6. The boat (10) according to claim 1 characterized in that said it comprises two steerings (14) positioned between said hull (12) and said two propellers (21, 21').

* * * * *